(12) United States Patent
Schroder et al.

(10) Patent No.: US 7,012,214 B2
(45) Date of Patent: Mar. 14, 2006

(54) NANOPOWDER SYNTHESIS USING PULSED ARC DISCHARGE AND APPLIED MAGNETIC FIELD

(75) Inventors: Kurt A. Schroder, Coupland, TX (US); Doug K. Jackson, Austin, TX (US)

(73) Assignee: Nanotechnologies, Inc., Austin, TX (US)

( * ) Notice: Subject to any disclaimer, the term of this patent is extended or adjusted under 35 U.S.C. 154(b) by 2 days.

(21) Appl. No.: 10/669,858

(22) Filed: Sep. 24, 2003

(65) Prior Publication Data

US 2005/0061785 A1 Mar. 24, 2005

(51) Int. Cl.
*B23K 9/00* (2006.01)

(52) U.S. Cl. .......................... 219/121.36; 219/121.59; 219/651

(58) Field of Classification Search ........... 219/121.11, 219/121.36, 121.39, 121.43, 121.47, 121.59; 423/592.1, 613, 325, 345; 427/547; 205/334; 75/343

See application file for complete search history.

(56) References Cited

U.S. PATENT DOCUMENTS

| | | | |
|---|---|---|---|
| 5,514,349 | A | 5/1996 | Parker et al. |
| 5,560,960 | A | 10/1996 | Singh et al. |
| 5,581,507 | A | 12/1996 | Scherpenberg et al. |
| 5,874,684 | A | 2/1999 | Parker et al. |
| 5,962,082 | A * | 10/1999 | Hendrickson et al. ...... 427/547 |
| 6,126,740 | A | 10/2000 | Schulz et al. |
| 6,190,634 | B1 | 2/2001 | Lieber et al. |
| 6,214,195 | B1 * | 4/2001 | Yadav et al. ................. 205/334 |
| 6,217,901 | B1 | 4/2001 | Perrott et al. |
| 6,392,188 | B1 * | 5/2002 | Milani et al. .......... 219/121.43 |
| 6,719,821 | B1 * | 5/2002 | Milani et al. .................. 75/343 |
| 6,472,374 | B1 | 10/2002 | Charnock-Jones et al. |
| 6,472,632 | B1 | 10/2002 | Peterson et al. |
| 6,479,028 | B1 | 11/2002 | Kaner et al. |
| 6,777,639 | B1 * | 8/2004 | Schroder et al. ........ 219/121.59 |
| 2003/0108459 | A1 | 6/2003 | Wu |
| 2003/0143153 | A1 * | 7/2003 | Boulos et al. ............ 423/592.1 |

OTHER PUBLICATIONS

Weihua Jiang and Kiyoshi Yatsui, "Pulsed Wire Discharge for Nanosize Power Synthesis", IEEE Transactions On Plasma Science, Oct. 1998, pp. 1498-1501, vol. 26, No. 5, IEEE, United States.
A. Weisenburger, "Application of Pulsed Power and Microwave Techniques for the Production of Nano-crystalline Powders and Ceramic Bulk Materials", Published in Metastable, Mechanically Allowed and Nanocrystalline Materials, year 2000, pp. 545-550, Materials Science Forum, vols. 343-346, Trans Tech Publishers Ltd., Switzerland.

* cited by examiner

*Primary Examiner*—Tu Hoang
(74) *Attorney, Agent, or Firm*—Ross Spencer Garsson; Winstead Sechrest & Minick P.C.

(57) ABSTRACT

Nanopowder synthesis systems in which a pulsed magnetic field is applied to electrodes of precursor material, in close proximity to an electrical discharge arc that is formed between the electrodes, to attain increased yields of nanopowder. A magnet insert of a coating precursor material is used to coat the nanopowder and thereby reduce nanoparticle agglomeration.

26 Claims, 6 Drawing Sheets

NANOPOWDER SYNTHESIS USING PULSED ARC DISCHARGE AND APPLIED MAGNETIC FIELD

RELATED PATENT APPLICATION

In the present invention, further improvements are made in the synthesis of nanopowders by applying a high intensity magnetic field to electrodes of precursor material during the time that an electrical discharge arc is generated between the electrodes. Higher production yields thereby are attained than that achievable by the above prior art nanopowder synthesizing systems. Further improvement is obtained if a magnet insert of coating precursor material is used to reduce agglomeration of the nanopowder particles.

FIELD OF THE INVENTION

The invention relates generally to nanopowder synthesis processes, and more particularly to the use of an applied magnetic field to significantly increase nanopowder production rates resulting from a synthesis process.

BACKGROUND OF THE INVENTION

Plasma based systems for synthesizing nanopowders are disclosed in U.S. Pat. Nos. 5,514,349; 5,874,684; and 6,472,632. The axial electrothermal gun embodiment disclosed in U.S. Pat. No. 6,472,632 is an improvement over the plasma based synthesis systems of the '349 and '684 patents. The '632 system uses a high powered pulsed arc discharge in combination with an axial electrothermal gun to attain a higher temperature and higher density of the plasma that is not ordinarily attainable by the other plasma based synthesis systems. The higher temperature and higher density provides a higher production rate of nanopowder.

A still further improvement in nanopowder production is provided by the nanopowder synthesis system disclosed in U.S. patent application Ser. No. 10/455,292, which issued as U.S. Pat. No. 6,777,639. Referring to FIG. 3 of the Application, two indexable electrodes of a radial gun are substantially axially aligned, but spaced apart opposite to each other within a gaseous atmosphere, and connected to a high power, pulsed discharge power supply. The electrodes are composed of a precursor material which is ablated by the energy created by a discharge of the power supply to form a high temperature (of the order of 50,000° K.), high density metal plasma that acts to sustain the electrical discharge from the pulsed power supply. The plasma so created is quenched by and/or reacts with the gaseous atmosphere to achieve higher yields of nanopowders comprised of more uniform and smaller sized nanoparticles. Further, such improvements are realized with the consumption of less energy than is required by the other known prior art systems.

A reoccurring problem in the above prior art systems is that the arc discharge may occur from time to time at other than the center of the electrodes. In this event, the resistance of the discharge arc is decreased, and less energy may be added to the arc discharge for a given arc current. The plasma that is created thus may be of a lower temperature and/or lower density than otherwise could be attained. As a result, production rates are decreased, and the material produced is of a non-uniform quality.

FIG. 4 of U.S. patent application Ser. No. 10/455,292, which issues as U.S. Pat. No. 6,777,639, discloses a composite electrode embodiment of the above radial gun, where the electrodes are each seated within hollow ablative bodies to form composite electrodes. Although the discharge arc may emanate from the edges of the anode and cathode electrodes, it will remain near the center of the composite electrodes to approach the high temperatures and high densities that otherwise would be available if the discharge arc emanated from the centers of the anode and cathode electrodes.

In the present invention, further improvements are made in the synthesis of nanopowders by applying a high magnetic field to electrodes of precursor material during the time that an electrical discharge arc is generated between the electrodes. Higher production yields thereby are attained than that achievable by the above prior art nanopowder synthesizing systems. Further improvement is obtained if a magnet insert of coating precursor material is used to reduce agglomeration of the nanopowder particles.

BRIEF DESCRIPTION OF THE DRAWINGS

While the novel aspects and features of the invention are defined in the appended claims, the principles of the invention, illustrative embodiments, and preferred modes of use are best understood by reference to the Detailed Description Of Preferred Embodiments in conjunction with the following drawings, in which:

DETAILED DESCRIPTION OF PREFERRED EMBODIMENTS

The following terms shall have the definitions given below when used in either lower case or with capitalizations in this specification.

"Nanopowder" shall mean nanomaterial primarily comprised of nanoparticles which are of a size of 1–500 nanometers (nm).

"Ablative Material" shall mean material removed from a body of precursor material due to the combined effects of heat transfer and mechanical shear caused by plasma velocities.

"Precursor Material" shall mean material which is processed to produce nanopowder.

"Coating Precursor Material" shall mean material which is processed to produce a coating on the nanopowder.

"Radial Gun" shall mean a device wherein a pulsed arc discharge occurs between two opposing electrodes composed of a precursor material. The electrodes are substantially axially aligned opposite to each other within a gaseous atmosphere. The term "radial gun" is used for convenience only, and is not meant to imply any limitation of the present invention.

"High Intensity Magnetic Field" shall mean a magnetic field in the range of 0.50 or more Tesla.

"High Power" shall mean power of the order of 100 kWatts or more.

Same reference numbers used in the description of the invention which follows will refer to same devices, whether or not they appear in more than one drawing.

Figure 1:
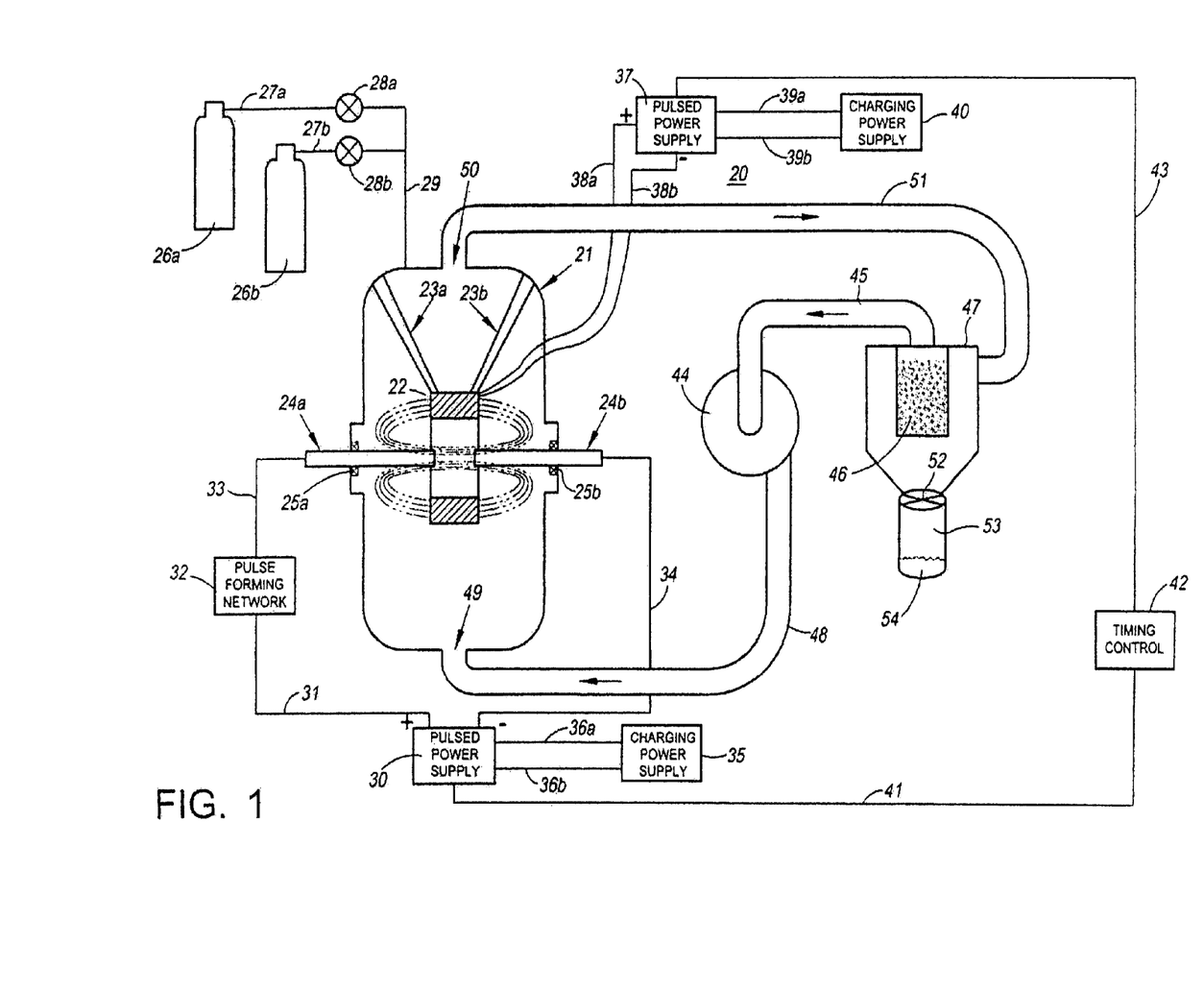
FIG. 1 is a functional block diagram of a nanopowder synthesis system in accordance with the invention.

Referring to FIG. 1, a nanopowder synthesis system 20 is illustrated with a reaction chamber 21 having a solenoid magnet 22 held in place within the reactor vessel 21 by mechanical struts 23a and 23b. The solenoid magnet 22 is designed to provide high intensity magnetic fields in the range of 0.50–5.0 Tesla. It is to be understood that while a solenoid magnet is referred to in the preferred embodiment, it is the magnetic field which is generated rather than the shape of the magnet which is of importance to the invention.

The solenoid magnet 22 is a magnet which creates a high intensity magnetic field principally along its major axis. The magnetic field may be varied by varying the power supplied to the magnet. Alternatively, the number of windings, or the diameter of the windings of the magnet could be altered to vary the magnetic field.

Two electrodes 24a and 24b composed of precursor material are slidably inserted through pneumatic seals 25a and 25b. The electrodes 24a and 24b are axially aligned but spaced apart in opposing relation. The solenoid magnet 22 is axially aligned with the electrodes 24a and 24b, and positioned uniformly around the electrodes to overlap the gap between the electrodes.

The solenoid magnet 22 may be purchased from any of numerous well known manufacturers of custom designs including Everson Tesla Inc. of Nazarath, Pa., and Cryogenics Limited of London, United Kingdom.

Gas sources 26a and 26b respectively supply reaction gas and quenching gas by way of gas conduits 27a and 27b, and gas valves 28a and 28b, to gas conduit 29. The gas conduit 29 in turn extends through and is in pneumatically sealed relation with the outer surface of the reaction chamber 21.

The positive terminal of a pulsed power supply 30 is connected by way of a conducting wire 31 to a first terminal of a pulse forming network 32, the second terminal of which is connected by way of a conducting wire 33 to the end of the electrode 24a which is exterior to the reaction chamber 21. The negative terminal of power supply 30 is connected by way of a conducting wire 34 to the end of electrode 24b which is exterior to the reaction chamber 21. Output terminals of a charging power supply 35 are connected by way of conducting wires 36a and 36b to input terminals of the pulsed power supply 30.

The positive and negative terminals of pulsed power supply 37 respectively are connected by way of conducting wires 38a and 38b to electrodes of the solenoid magnet 22. The input terminals of the pulsed power supply 37 are respectively connected by way of conducting wires 39a and 39b to output terminals of a charging power supply 40.

The main pulsed power supply 30 of FIG. 1 is capable of supplying up to 250 Kilo-Joules (kJ) of energy with a peak current and voltage of 120,000 Kilo-Amps (kA) and 10 Kilo-Volts (kV), respectively. The pulsed power supply 37 is capable of supplying up to 30 Kilo-Joules of energy with a peak current and voltage of 30,000 Kilo-Amps and 2 Kilo-Volts, respectively. The power supplies may be any of plural well-known designs (which may vary depending upon the material and material size being produced) that are offered commercially by any of numerous well known manufacturers such as Utron, Inc. of Manassas, Va., and Maxwell Technologies, of San Diego, Calif.

A trigger input terminal of pulsed power supply 30 is connected by way of a fiber optic cable 41 to a first output terminal of a timing control system 42, the second output terminal of which is connected by way of a fiber optic cable 43 to the trigger input terminal of pulsed power supply 37.

The intake port of a blower 44 is connected to a conduit 45 leading to the output of a filter 46 located within a collection vessel 47. The output port of the blower 44 is connected to a conduit 48 leading to an intake port 49 of the reaction chamber 21. An output port 50 of the reaction chamber 21 is connected to a conduit 51 leading to an input port of the collection vessel 47.

The conically shaped bottom of the collection vessel 47 tapers inward to an isolation valve 52 which is connected to a collection jar 53 for collecting filtered nanopowder particulates.

In operation, one or more of the gas valves 28a and 28b are opened to respectively allow desired amounts of reaction gas from gas source 26a and quenching gas from gas source 26b to enter the reaction chamber 21. The gas is recirculated by the blower 44 in the closed loop system comprising the reaction chamber 21, conduit 51, collection vessel 47, conduit 45, and conduit 48. The charging power supplies 35 and 40 are energized to respectively charge the pulsed power supplies 30 and 37. The timing control system 42 thereupon is operated to trigger pulsed power supply 30 and pulsed power supply 37 in a timed relation which ensures that a high power pulsed electrical discharge arc occurs between the electrodes 24a and 24b in the presence of a pulsed, high intensity magnetic field. The corresponding pulsed plasma created by the ablation of the electrodes 24a and 24b reacts/quenches with the gas to form nanopowder. The nanopowder in turn flows out of the reaction chamber 21, through the conduit 51, and into the collection vessel 47. The filter 46 acts to filter out the nanopowder which is subsequently collected in the collection jar 53.

Figure 2:
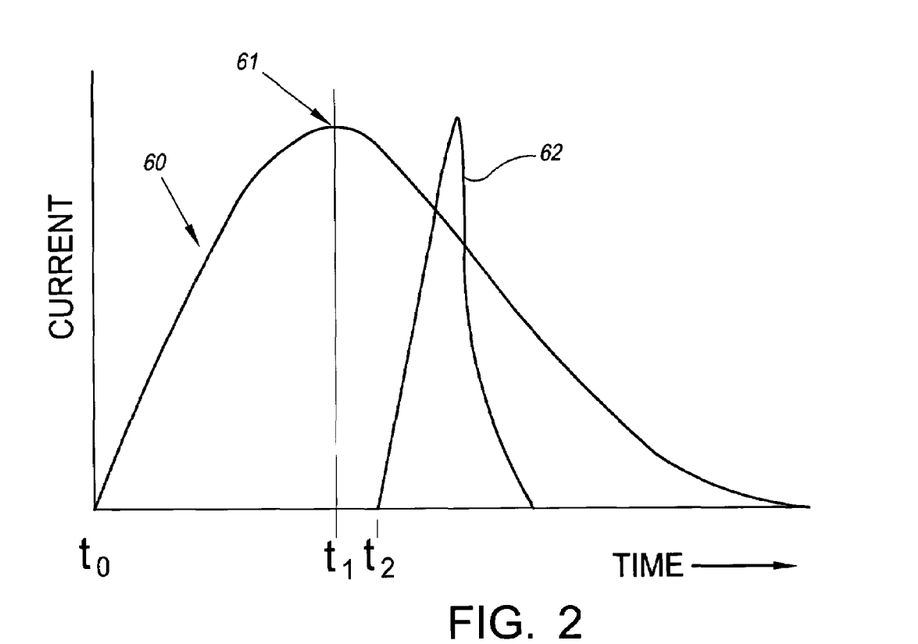
FIG. 2 is a graph showing the discharge currents generated by the pulsed power supply 30 and the pulsed power supply 37 of FIG. 1 above.

The timing control system 42 is set to allow the pulsed power supplies 30 and 37 to become fully charged before they are triggered. It has been found that the timing of the trigger pulses to the pulsed power supplies 30 and 37 directly affect the nanopowder production rate. Referring to FIG. 2, discharge current traces of the pulsed power supplies 30 and 37 are depicted as a function of time. FIG. 2 illustrates the preferred timing sequence for discharging the pulsed power supply 37 for solenoid magnet 22 of FIG. 1 before discharging pulsed power supply 30. Upon the pulsed power supply 37 being discharged at time $t_0$ of FIG. 2, a discharge current 60 occurs which peaks at apex 61 and time $t_1$. Thereafter, at a time $t_2$, the pulsed power supply 30 of FIG. 1 is discharged across the electrodes 24a and 24b to generate a current 62 of FIG. 2. Although improvements in production rate occur even when the above timing sequence is varied, e.g. both power supplies being discharged simultaneously, or the pulsed power supply 37 of FIG. 1 being discharged before the pulsed power supply 30, highest production rates occur when the peaks of the discharge currents for the two pulsed power supplies occur at approximately the same time.

It is to be understood that while FIG. 2 shows specific shapes for the magnet and electrode current traces, it is the timing of the pulsed power supply discharges which is controlled. For pulsed magnets, the timing in turn affects the strength of the magnetic field during the discharge of the pulsed power supply 30. Alternatively, the pulse shapes could be varied to change the magnetic field.

Continuing with the description of FIG. 1, once the magnet pulsed power supply 37 is triggered by the timing control system 42 to energize the solenoid magnet 22, the timing control system 42 triggers the pulsed power supply 30 to effect a high-power pulsed electrical arc discharge arc between the electrodes 24a and 24b. The energy from the discharge arc melts, vaporizes, and ionizes material from the two electrodes to create a metal plasma which continues to sustain the electrical discharge from the pulsed power supply 30. As the plasma undergoes expansion, it is quenched and/or reacts with the gases in the reaction chamber 21 to form nanopowders. The nanopowders are forced out of the reaction chamber 21 and into the conduit 51 by the blower 44. Thereafter, the nanopowders are collected in the bottom of the collection jar 53 as indicated by reference number 54.

Figure 3:
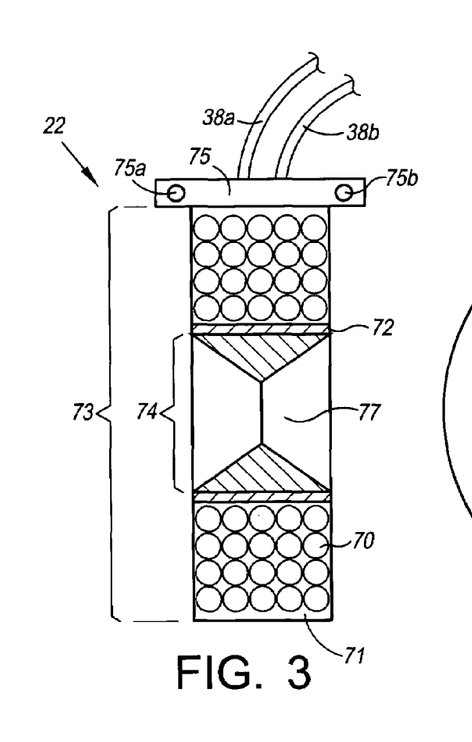
FIG. 3 is a cross-sectional view of a solenoid magnet used in the preferred embodiment of the invention illustrated in FIG. 1 above.

Referring to FIG. 3, the design of the magnet 22 of FIG. 1 is shown in more detail as being comprised of solenoid windings 70 seated within an epoxy material 71. The solenoid windings 70 of FIG. 3 are formed by wrapping a continuous length of insulated wire or tubing (if active cooling is desired) around a core 72 to form rows of overlapping coils that will produce the desired magnetic field when energized. The epoxy material 71 provides mechanical strength to the solenoid windings 70, allows easier mounting of the magnet within the reaction chamber 21 of FIG. 1, and provides additional insulation of the solenoid windings to minimize the likelihood of high voltage breakdown. In the preferred embodiment illustrated in FIG. 3, the outer diameter 73 of the magnet 22 is approximately twelve (12) inches, and the inner diameter 74 of the magnet is approximately six (6) inches.

The strength of the magnetic field produced by the magnet 22 may be determined from equations well known in the magnet design art, and is a function of the number and geometry of the windings, the input current, and the magnetic permeability of any matter between the windings and the point at which the field is measured. If the magnet is pulsed, electrical conductivity of the surrounding structures also will affect the field. The magnet 22 is supported in the reaction chamber 21 of FIG. 1 by a mounting bracket 75 of FIG. 3. The mounting bracket is molded into the magnet 22 during the fabrication process, and includes holes 75a and 75b for bolting the magnet respectively to mechanical struts 23a and 23b of FIG. 1. The ends of the insulated wire forming the solenoid windings 70 of FIG. 3 serve as power leads 38a and 38b, which are connected to the pulsed power supply 37 of FIG. 1.

A replaceable insert 77 of FIG. 3 is placed within the core 72 to protect the structural integrity of the magnet, and to protect the core from damage caused by the plasma that is created when the pulsed power supply 30 is discharged across the electrodes 24a and 24b. It has been found that when the insert 77 is composed of polycarbonate or polyethylene as a precursor material for coating the nanopowder, the erosion of the insert by the plasma reduces agglomeration of nanoparticles in the nanopowder that is produced. Further, it has been found that smaller nanoparticle sizes are achievable than otherwise would occur with inserts composed of other materials such as graphite. In addition, such coating precursor material may be introduced by means other than the insert 77. By way of example, a rod feeder may be used to introduce coating precursor material.

Figure 4:
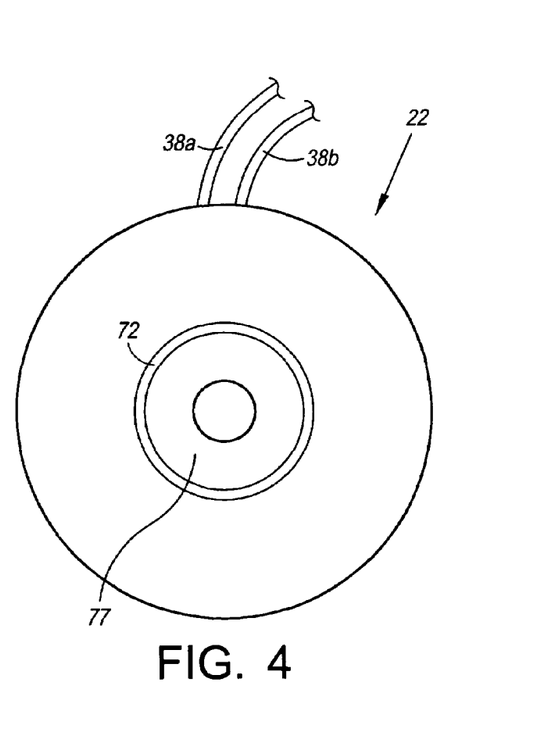
FIG. 4 is a side view of the solenoid magnet of FIG. 3 above with a central insert.

FIG. 4 is a side view of the magnet 22 which depicts the central, toroidal shaped insert 77 that may be a conductor, insulator, or semiconductor. The insert 77 not only acts to protect the integrity of the magnet as before stated, but also to control the direction of the expansion of the plasma created from the ablation of the electrodes 24a and 24b of FIG. 1. That is, the forty-five degree tapered edges of the insert 77 aids in controlling the profile of expansion of the plasma. It is to be understood that the insert 77 of FIG. 4 may have other shapes.

In actual test runs for producing silver nanopowder, electrodes of silver having a 0.25" diameter were used. The pulsed power supply 30 of FIG. 1 was operated at 5.3 kV, and 42 kJ, with a pulse length of 0.74 ms. The magnet 22 was comprised of four rows of six windings beginning with a diameter of 5.8". The windings themselves were composed of ⅜" copper tubing to accommodate water cooling as needed, and were spaced evenly across a 3.4" width. The windings were molded into an epoxy body with an inner diameter of 5.2", an outer diameter of 11", and a width of 3.4".

The replaceable insert 77 of FIG. 3 was composed of polycarbonate, and had an outer diameter of 5.16" which fit within the inner diameter 74 of the magnet 22, an inner diameter of approximately 2", and 45 degree tapered edges as depicted in FIG. 3. The pulsed power supply 37 of FIG. 1 used a capacitor bank of 28.8 millifarads which was charged to 1650 volts, and was discharged 3.3 ms before the discharge of pulsed power supply 30. By varying the charge level of the pulsed power supply 37 from test to test, it was found that the higher the charge level of the pulsed power supply 37 and thus the strength of the magnetic field, the higher the electrode ablation rate and nanopowder yield. Further, with a replaceable insert 77 made of polycarbonate or polyethylene, substantial reduction in nanoparticle sizes and agglomeration was found. A much lesser result was experienced when a replaceable insert of graphite was used.

Figure 5:
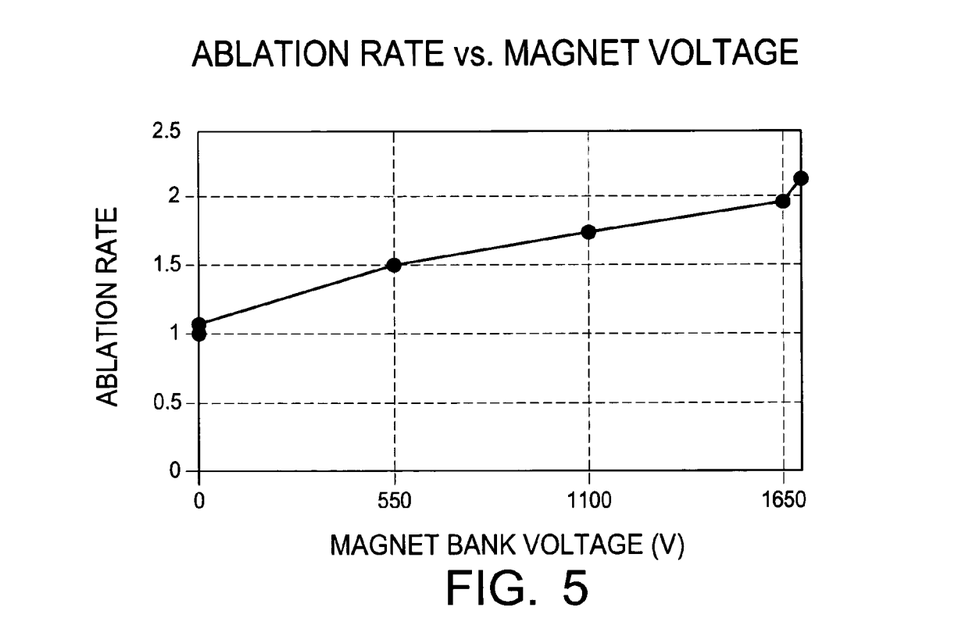
FIG. 5 is a graph showing the relation of electrode ablation rate to magnet power supply voltage.
Figure 6:
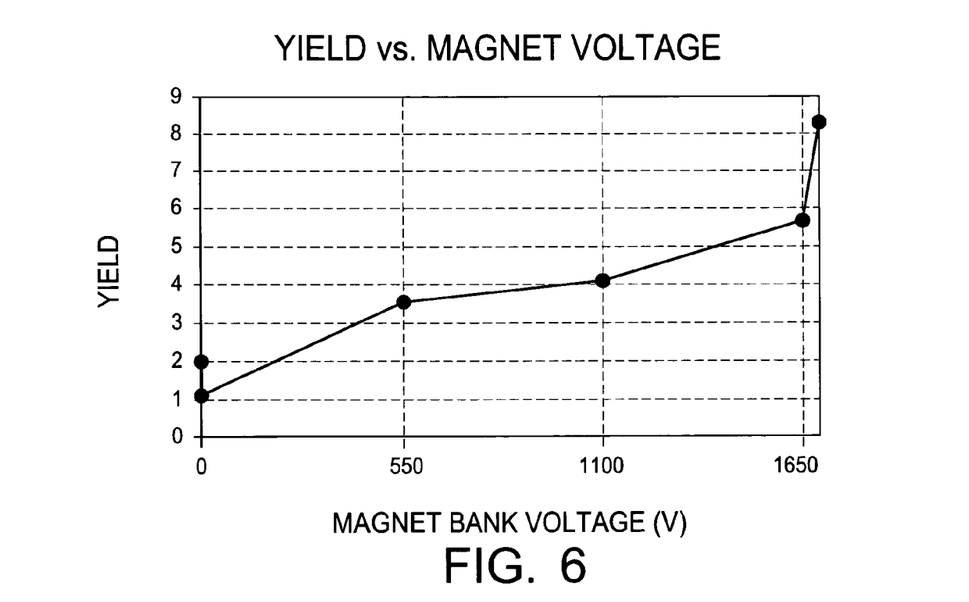
FIG. 6 is a graph showing the relation of nanopowder yield to magnet power supply voltage.

FIGS. 5 and 6 depict the results of the above tests at different discharge levels of pulsed power supply 37, followed by a discharge of the pulsed power supply 30 after a constant delay of 3.3 ms. The Figures indicate an increase in electrode ablation rate, and in nanopowder yield (approximately 100%), with increasing charge levels of the pulsed power supply 37 of FIG. 1.

Figure 7:
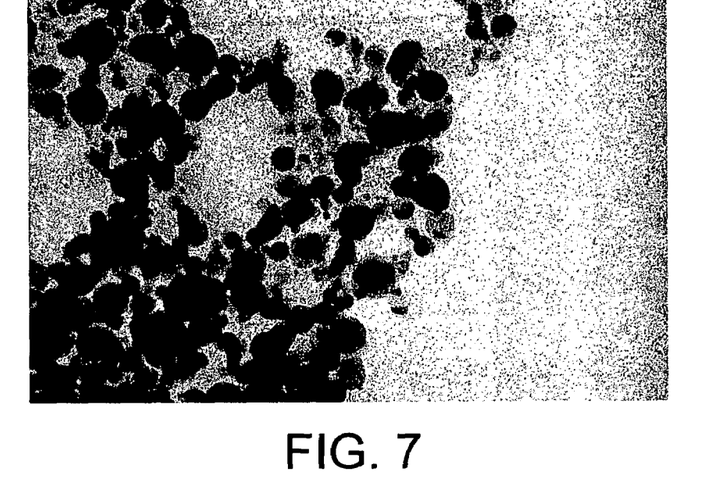
FIG. 7 is taken from a Transmission Electron Microscope (TEM) image of nanopowder produced with the magnet of FIG. 4 above having a polycarbonate insert.
Figure 8:
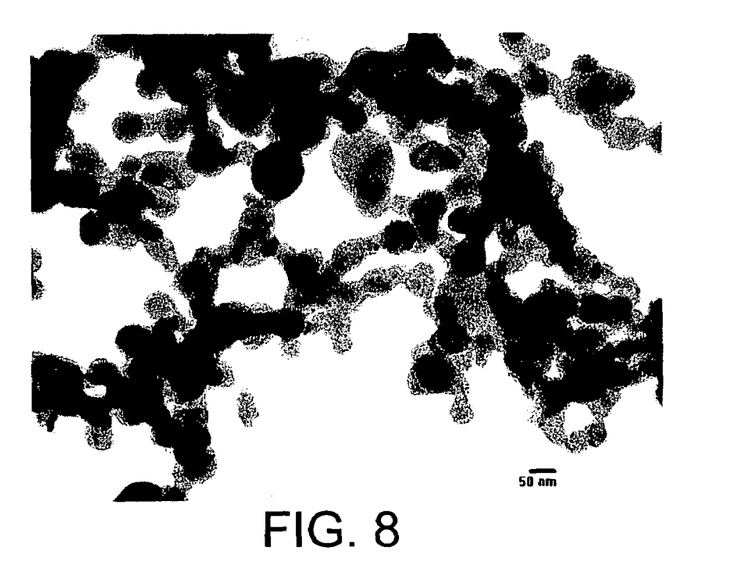
FIG. 8 is taken from a TEM image of nanopowder produced with the magnet of FIG. 4 above having a graphite insert.

FIGS. 7 and 8 graphically depict the differences in particle agglomeration occurring with a polycarbonate magnet insert as compared to a graphite magnet insert. More particularly, in actual tests the electrodes were of 0.25" diameter silver. The main pulsed power supply 30 was set to 5.3 kV, 42 kJ, and a pulse length of 0.74 ms. The ablation rate of the electrodes was comparable with either a polycarbonate magnet insert or a graphite magnet insert. Additionally, the polycarbonate insert showed higher improvements in nanopowder yield compared to the graphite insert. However, particle agglomeration occurring with the use of the polycarbonate insert as depicted in FIG. 7 was far less than the particle agglomeration occuring with the use of the graphite insert as depicted in FIG. 8. Further, under same production conditions as described above, particle sizes of the nanopowder (as measured by BET) were significantly smaller with the use of the polycarbonate insert as compared with the use of a graphite insert.

Figure 9:
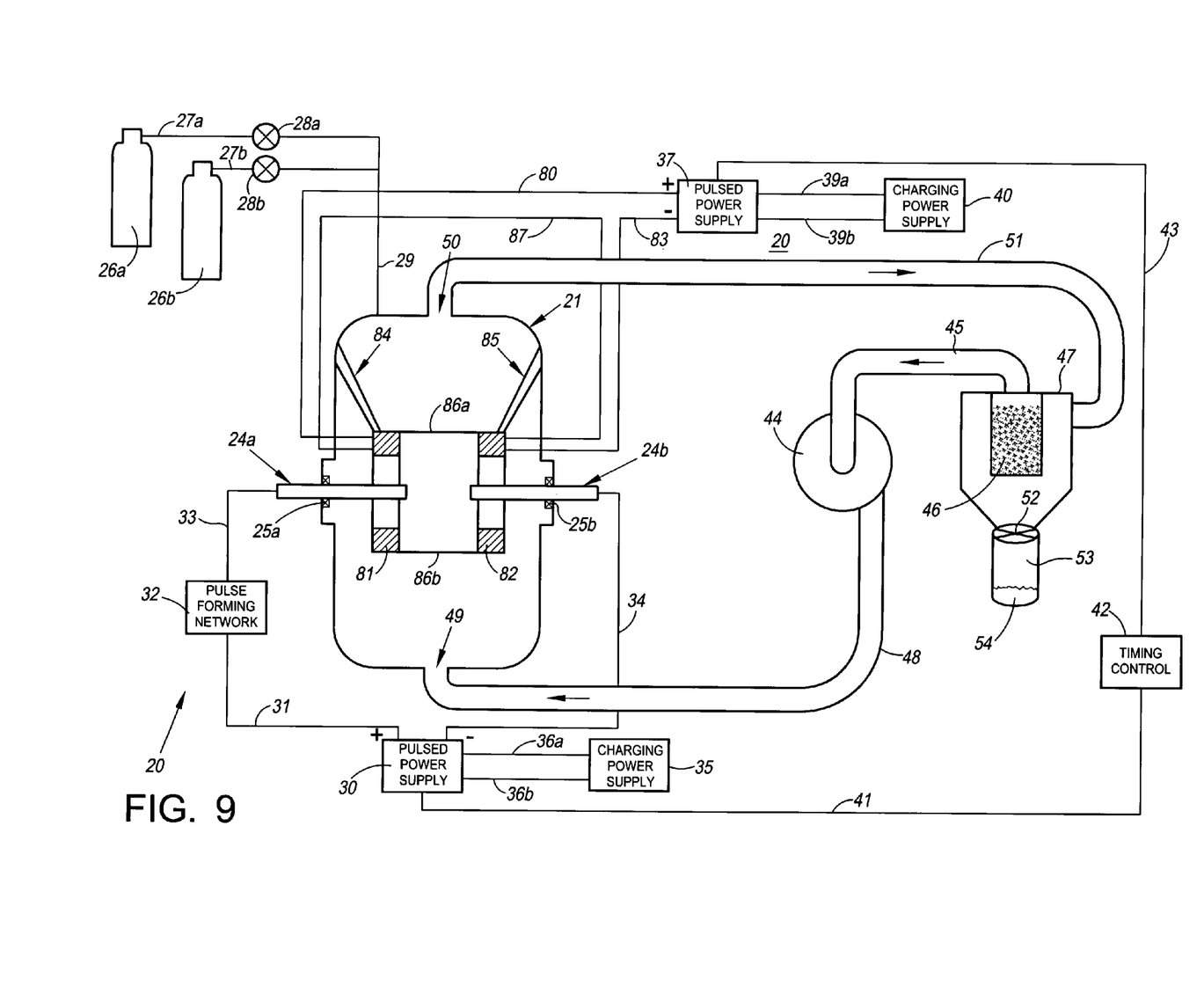
FIG. 9 is a functional block diagram of a dual magnet embodiment of the nanopowder synthesis system in accordance with the invention.

A dual magnet embodiment of the invention is illustrated in FIG. 9, where reference numbers previously used in FIG. 1 refer to like devices. Referring to FIG. 9, a conducting wire 80 is connected to a positive output of the pulsed power supply 37 and to the positive terminal of solenoid magnet 81. Solenoid magnet 81 is enclosed around electrode 24a near, but not overlapping, the gap between the electrodes 24a and 24b. In like manner, the solenoid magnet 82 is enclosed around the electrode 24b near, but not overlapping, the gap between the electrodes 24a and 24b. The gap between the electrodes 24a and 24b thereby is unrestricted to maintain an exit path for the plasma that is produced by the ablation of the electrodes 24a and 24b.

A conducting wire 83 is connected to the negative output of the pulsed power supply 37 and to the negative terminal of solenoid magnet 82. A conducting wire 87 connects the negative terminal of the solenoid magnet 81 to the positive terminal of the solenoid magnet 82, thereby connecting the solenoid magnets in series. The solenoid magnets 81 and 82 in turn are held in place by mechanical struts 84 and 85 (which are physically connected to the interior surface of the reaction chamber 21), and by aluminum spacers 86a and 86b (which maintain the space between the magnets and maintain axial alignment of the principal axis of the magnets).

The operation of the embodiment of the invention as illustrated in FIG. 9 is almost identical to that of the embodiment of FIG. 1. The exception being that upon pulsed power supply 37 being triggered by the timing control system 42, the discharge current produced by the pulsed power supply 37 is applied to the two solenoid magnets 81 and 82 rather than to a solitary magnet. The polarity of the discharge current, and the sense of the windings of the two solenoid magnets 81 and 82, ensure that the magnetic fields produced by the two magnets are additive to effect a nanopowder yield and reduction in nanoparticle agglomeration comparable to that attained by the single magnet embodiment of FIG. 1.

Figure 10:
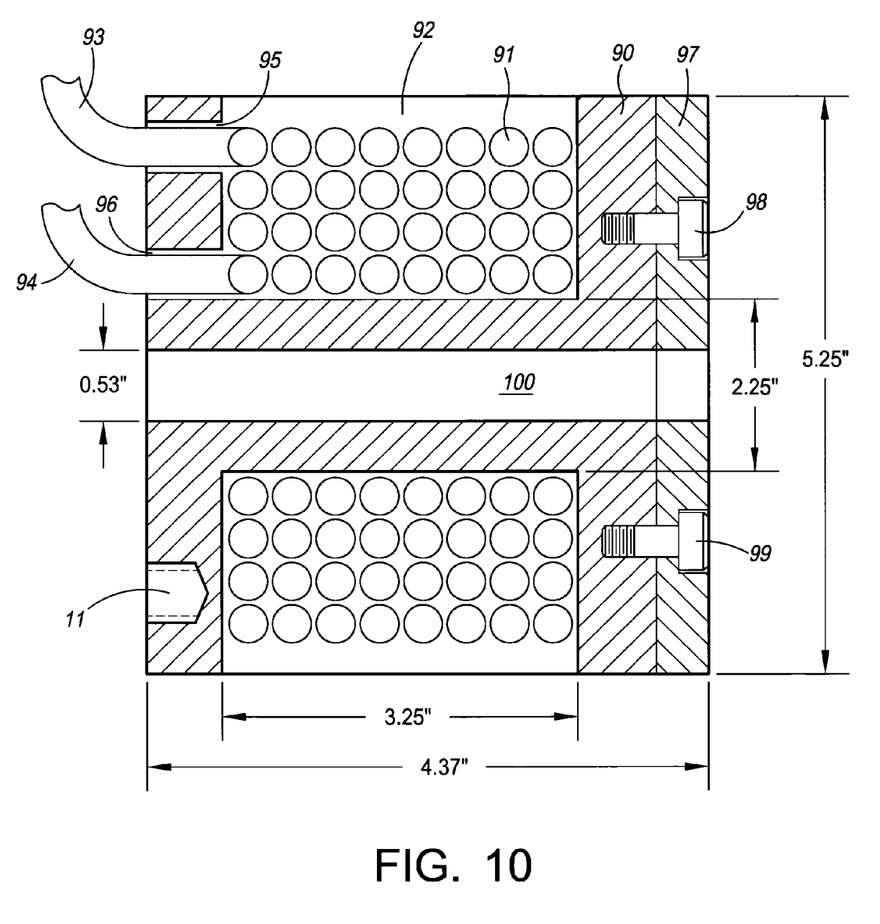
FIG. 10 is a cross-sectional view of one of the dual magnets of FIG. 9.

FIG. 10 illustrates a cross-section of a preferred embodiment of one of the solenoid magnets 81 and 82 of FIG. 9. Referring to FIG. 10, the magnet is comprised of a non-conducting spool 90 about which wire 91 is wound to produce the windings of the magnet. As depicted in FIG. 10, the windings consist of four rows of eight windings with the wire 91 being contained within an epoxy matrix 92. The epoxy matrix provides electrical isolation and mechanical support for the windings. Electrical leads 93 and 94 respectively extend from opposite ends of wire 91 through pathways 95 and 96. The electrical leads 93 and 94 may be connected to a pulsed power supply or another magnet.

A replaceable shield 97 is placed on the face of the magnet near the gap between the electrodes 24a and 24b of FIG. 9. Returning to FIG. 10, the replaceable shield 97 which protects the integrity of the magnet is attached to the magnet face by means of screws 98 and 99.

Typically, the replaceable shield is composed of a polycarbonate material which coats the nanopowder during the synthesis process and thereby reduces nanoparticle agglomeration.

As shown in FIG. 10, the outer diameter of a preferred embodiment of the magnet is 5.25', while the inner diameter of the spool is 2.25". Further, the outer width of the spool is 4.37", while the inner width is 3.25". The diameter of the cylindrical center path 100 through the replaceable shield 97 and spool 90 is 0.53".

It is to be understood that instead of a solitary solenoid magnet embodiment of the invention as illustrated in FIG. 1, or a dual solenoid magnet embodiment as illustrated in FIG. 9, other forms of magnets such as a generally available permanent magnet, or a superconducting magnet such as are manufactured to custom design specifications and sold commercially by Cryogenics Limited of London, United Kingdom, may be used with comparable results.

Although the preferred embodiments of the invention have been described in detail, various substitutions, modifications, and alterations can be made without departing from the spirit and scope of the invention as defined in the claims. By way of example, while the use of a magnetic field in accordance with the invention has been shown and described in connection with a radial gun form of a pulsed plasma system, the invention also is applicable to other plasma based systems. In a transfer arc system for synthesizing nanopowder, which includes a plasma torch and a single precursor member, the magnetic field could be applied around the precursor member in near proximity to the area of plasma interaction to increase the precursor material removal rate and thus nanopowder yield. Similarly, increased yield may be attained in a microwave system for synthesizing nanopowder by applying a magnetic field in near proximity to the area where plasma interacts with the precursor material.

While the preferred embodiments described above refer to a solenoid magnet containing an insert that may provide a precursor coating material that may interact with the plasma, it is to be understood that the same result could be obtained without an insert by using an independent source to feed precursor coating material for interaction with the plasma.

The above descriptions have been made by way of preferred examples, and are not to be taken as limiting the scope of the present invention as defined by the following claims.

What is claimed is:

1. A method for substantially increasing production rates of nanopowder in a nanopowder synthesis system, which comprises the steps of:
   immersing at least one member of precursor material in a gaseous atmosphere;
   applying a high intensity magnetic field to said precursor material in an area of plasma interaction with said at least one member of precursor material; and
   forming a plasma that interacts with said at least one member of precursor material and said gaseous atmosphere to produce said nanopowder.

2. A method for substantially increasing production rates of nanopowder in a nanopowder synthesis system, which comprises the steps of:
   immersing into a gaseous atmosphere a pair of ablative electrodes of precursor material which are in substantial axial alignment but spaced apart in opposing relation;
   applying a high intensity magnetic field to said pair of ablative electrodes which is in near proximity to area of plasma interaction with said pair of ablative electrodes; and
   forming a high power pulsed electrical discharge arc between said pair of ablative electrodes to generate a plasma that interacts with said gaseous atmosphere to produce said nanopowder.

3. The method of claim 2, wherein the step of forming said high power pulsed electrical discharge arc occurs a time delay after the step of applying said high intensity magnetic field, and said time delay is such as to ensure that said high intensity magnetic field is present when said high power pulsed electrical discharge arc is formed.

4. The method of claim 2, wherein the step of applying said high intensity magnetic field is initiated at a same time as the step of forming said high power pulsed electrical discharge arc.

5. The method of claim 2, wherein said high intensity magnetic field and said plasma are pulsed.

6. The method of claim 2, wherein said gaseous atmosphere is comprised of at least one of a quenching gas and a reaction gas.

7. A system for synthesizing nanopowder in increased yields, which comprises:
   at least one member of precursor material immersed in a gaseous atmosphere;
   means for applying a high intensity magnetic field to said at least one member of precursor material in near proximity of area of interaction of said at least one member of precursor material with a plasma; and
   power means, in electrical connection with said at least one member of precursor material and said means for applying a high intensity magnetic field, for creating said plasma in the presence of said high intensity magnetic field to thereby produce said nanopowder.

8. A method for substantially increasing production rates of a nanopowder while reducing nanoparticle agglomeration in a nanopowder synthesis system, which comprises the steps of:
   immersing at least one member of nanopowder precursor material in a gaseous atmosphere;
   supplying a coating precursor material, for coating said nanopowder, into said gaseous atmosphere;
   applying a high intensity magnetic field to said at least one member of nanopowder precursor material in an area of plasma interaction with said at least one member of nanopowder precursor material; and
   applying a high power pulsed electrical discharge arc to said at least one member of nanopowder precursor material to generate a plasma that interacts with said gaseous atmosphere to produce said nanopowder.

9. A system for synthesizing nanopowder in increased yields with reduced nanoparticle agglomeration, which comprises:
   at least one member of a nanopowder precursor material immersed in a gaseous atmosphere;
   means for applying a high intensity magnetic field to said at least one member of said nanopowder precursor material in near proximity of an area of interaction of said at least one member of said nanopowder precursor material with a plasma;
   power means, in electrical connection with said at least one member of said nanopowder precursor material and said means for applying a high intensity magnetic field, for creating said plasma in the presence of said high intensity magnetic field to produce said nanopowder; and
   means for applying a coating precursor material to said nanopowder to reduce nanoparticle agglomeration.

10. A system for synthesizing nanopowder in increased yields, which comprises:
    a pair of electrodes of precursor material axially aligned but spaced apart in opposing relation;
    a solenoid magnet for generating a high intensity magnetic field which surrounds opposing tips of said pair of electrodes and overlapping a space gap between said pair of electrodes, with a principal axis of said solenoid magnet in axial alignment with said pair of electrodes;
    means for immersing said pair of electrodes in a gaseous atmosphere; and
    power means in electrical connection with said solenoid magnet and said pair of electrodes for energizing said solenoid magnet to generate the high intensity magnetic field, and forming a high power pulsed electrical discharge arc between said pair of electrodes in the presence of said high intensity magnetic field to create a plasma for producing said nanopowder.

11. The system for synthesizing nanopowder of claim 10 above, wherein said solenoid magnet is energized first, and after a time delay occurs said high power pulsed electrical discharge arc is formed between said pair of electrodes.

12. The system for synthesizing nanopowder of claim 10 above, wherein said solenoid magnet is energized at a same time as said high power pulsed electrical discharge arc is formed between said pair of electrodes.

13. The system for synthesizing nanopowder of claim 10 above, wherein a one of a permanent magnet and a superconducting magnet is used instead of said solenoid magnet.

14. The system for synthesizing nanopowder of claim 10 above, wherein said solenoid magnet is replaced by dual magnets electrically connected in series, wherein principal axis of said dual magnets are in axial alignment with said pair of electrodes, and wherein said dual magnets are spaced apart with a first of said dual magnets surrounding a first of said pair of electrodes at a distance from said space gap, and a second of said dual magnets surrounding a second of said pair of electrodes at a distance from said space gap.

15. The system for synthesizing nanopowder of claim 14 above, wherein each of said dual magnets includes a replaceable shield facing said space gap.

16. The system for synthesizing nanopowder of claim 10 above, wherein said solenoid magnet includes a central insert for protecting structural integrity of said solenoid magnet and controlling direction of expansion of said plasma.

17. The system for synthesizing nanopowder of claim 16 above, wherein said central insert is ablative, and is composed of one of polycarbonate, and polyethylene.

18. A system for synthesizing nanopowder in increased yields with reduced nanoparticle agglomeration, which comprises:
    at least one member of precursor material for ablation in producing plasma;
    a solenoid magnet having a principal axis which is axially aligned with said at least one member of precursor material for applying a high intensity magnetic field in near proximity to interaction of said at least one member of precursor material with said plasma;
    means for immersing said at least one member of precursor material in a gaseous atmosphere of one of a reaction gas, a quenching gas, and a combination of said reaction gas and said quenching gas; and
    power means, in electrical connection with said solenoid magnet and said at least one member of precursor material, for generating said high intensity magnetic field and said plasma.

19. A system for synthesizing nanopowders, which comprises:
    a reaction chamber having a gaseous atmosphere;
    a pair of ablative electrodes in axial alignment but spaced apart in opposing relation, with said pair of ablative electrodes being indexable toward each other and in pneumatically sealed relation with said reaction chamber;
    a solenoid magnet having a principal axis which is axially aligned with said pair of ablative electrodes, and surrounding opposing electrode tips of said pair of ablative electrodes while overlapping a space gap between said pair of ablative electrodes;

a first pulsed power supply system electrically connected to said solenoid magnet for creating a high intensity magnetic field;

a second pulsed power supply system electrically connected to said pair of ablative electrodes for generating a high power pulsed electrical discharge arc between said pair of ablative electrodes and in the presence of said high intensity magnetic field; and a timing control system electrically connected to said first pulsed power supply system and to said second pulsed power supply system for controlling timing and order of occurrence of said high intensity magnetic field and said high power pulsed electrical discharge arc.

20. The system for synthesizing nanopowder of claim 19 above, wherein said timing control system causes said high intensity magnetic field and said high power pulsed electrical discharge arc to be initiated at a same time.

21. The system for synthesizing nanopowders of claim 19 above, wherein said timing control system causes said high power pulsed electrical discharge arc to be initiated a time delay after said high intensity magnetic field is initiated.

22. The system for synthesizing nanopowder of claim 16 above, wherein said central insert is ablative, and is composed of one of a plastic and a polymer.

23. The system for synthesizing nanopowders of claim 19 above, wherein said gaseous atmosphere is comprised of one of a quenching gas and a reaction gas.

24. The system for synthesizing nanopowders of claim 19 above, wherein said gaseous atmosphere is comprised of a combination of a quenching gas and a reaction gas.

25. The system for synthesizing nanopowders of claim 19 above, wherein said solenoid magnet includes an insert for protecting an inner diameter surface of said solenoid magnet from plasma created by said high power pulsed electrical discharge arc.

26. The system for synthesizing nanopowders of claim 25 above, wherein said insert is one of a conductor, an insulator, and a semiconductor, and is composed of a coating precursor material for coating nanoparticles to reduce agglomeration.

* * * * *